(12) United States Patent
Gibault

(10) Patent No.: US 8,109,437 B2
(45) Date of Patent: *Feb. 7, 2012

(54) SYSTEM FOR SELF CHECKOUT

(75) Inventor: Dimitris Gibault, Cagnes sur mer (FR)

(73) Assignee: International Business Machines Corporation, Armonk, NY (US)

( * ) Notice: Subject to any disclaimer, the term of this patent is extended or adjusted under 35 U.S.C. 154(b) by 509 days.

This patent is subject to a terminal disclaimer.

(21) Appl. No.: 12/330,841

(22) Filed: Dec. 9, 2008

(65) Prior Publication Data

US 2009/0090776 A1     Apr. 9, 2009

Related U.S. Application Data

(63) Continuation of application No. 11/366,334, filed on Mar. 2, 2006, now Pat. No. 7,464,869.

(30) Foreign Application Priority Data

Apr. 19, 2005   (EP) ..................... 05300292

(51) Int. Cl.
*G06K 15/00*     (2006.01)
(52) U.S. Cl. ................... 235/383; 235/472.02
(58) Field of Classification Search ............ 235/383, 235/472.02, 375; 705/16, 17
See application file for complete search history.

(56) References Cited

U.S. PATENT DOCUMENTS

| 6,989,749 | B2 | 1/2006 | Mohr | |
| 7,464,869 | B2* | 12/2008 | Gibault | 235/383 |
| 2001/0013539 | A1 | 8/2001 | Hashimoto | |

FOREIGN PATENT DOCUMENTS

CN    1465027    12/2003

OTHER PUBLICATIONS

IBM, Subject: Information Disclosure Statement, Prior Art Listed, Chinese Office Action Dated Jul. 11, 2008.
USPTO, Office Action Dated Feb. 27, 2007 for U.S. Appl. No. 11/366,334, filed Mar. 2, 2006.
USPTO, Final Office Action Dated Jun. 25, 2007 for U.S. Appl. No. 11/366,334, filed Mar. 2, 2006.
USPTO, Office Action Dated Dec. 14, 2007 for U.S. Appl. No. 11/366,334, filed Mar. 2, 2006.
Le, U.S. Appl. No. 11/366,334, Notice of Allowance & Fees Due, FR920040089US1, Jun. 26, 2008, 6 pages.

* cited by examiner

*Primary Examiner* — Thien M Le
(74) *Attorney, Agent, or Firm* — Andrea Bauer; Hoffman Warnick LLC

(57) ABSTRACT

The present invention relates to a self check-out system which uses contact free tags embedded in a receptacle, e.g., a plate, glass, etc. The system relates the tag to a service area and uses that relationship to associate the receptacle with a charge to be made to a customer.

15 Claims, 3 Drawing Sheets

| Catering Area | RFID number | Receptacle number | Cost Associated with RFID Type | Tray content | Debit for RFID Card |
|---|---|---|---|---|---|
| 12 | 10111111 | 18 | 6 | YES | 6 |
| 14 | 11111111 | 20 | 4 | YES | 4 |
| 16 | 10101010 | 22 | 3 | YES | 3 |
|  |  |  |  |  |  |
|  |  |  |  | TOTAL | 13 |

Fig. 3

| RFID Card Number | Customer details | Present Card Credit | Debits to be Charged | Updated Card Credit Debit |
|---|---|---|---|---|
| 12345 | Dimitri Gibault | 26.50 | 13 | 13.50 |
| 23456 | Tom Jones | 39 | 12 | 27 |
|  |  |  |  |  |

Fig. 4

SYSTEM FOR SELF CHECKOUT

CROSS-REFERENCE TO RELATED APPLICATIONS

This application is a continuation application of co-pending U.S. patent application Ser. No. 11/366,334, filed on Mar. 2, 2006, now U.S. Pat. No. 7,464,869 which is hereby incorporated by reference.

FIELD OF INVENTION

This invention is directed to self checkout systems, particularly but not exclusively to improvements relating to the checkout capabilities of a retail establishment.

BACKGROUND ART

In many establishments including retail food establishments, and in particularly cafeterias, it is not uncommon to queue for some time in order to pay for goods or a meal. In most establishments there is a cashier who reviews all the items selected and prepares the bills. The goods may then be paid for using cash, or in some establishment if the customer has an account, they may pay using an account.

The latter payment solution is most common in establishments provided by employers for their employees, where the employees have an employee number and an identification card, which can be used to facilitate payment for the goods. Credit details may be associated with the identification card and can be topped up from time to time via known means. However, there may still be considerable waiting time and delays produced in most establishments since the cashier still has to review all the items selected by the customer.

SUMMARY OF THE INVENTION

One of the objects of the present invention is to provide a self checkout system (SCO System) which overcomes at least some of the problems associated with the prior art systems.

The present invention is directed to improvements relating to the checkout capabilities of a retail establishment.

More particularly the present invention discloses a system for providing self checkout for an establishment, the establishment comprising a plurality of separate serving areas, comprising: a tray; a plurality of receptacles placed on the tray, the plurality of receptacles selected from a plurality of separate serving areas, each serving area comprising a different catering area within the establishment and providing a different type of content, wherein the content of each selected receptacle is dictated and associated with the serving area from which the receptacle was taken; a system for reading information in a tag embedded in each selected receptacle placed on the tray, wherein the information in the tag is associated with the serving area from which the receptacle was taken and at least one of the content of the selected receptacle and a cost per unit weight of the content of the selected receptacle; a system for associating, in a database, the tag information for each selected receptacle with the serving area from which the selected receptacle was taken; a system for determining a charge for the content of each selected receptacle from the database association; a tag, located on a customer, containing information regarding a credit level of the customer and a requirement for debiting the customer; a system for charging a customer for the content of each selected receptacle placed on the tray and determining a total cost to be charged to the customer for the plurality of selected receptacles; a system for reading the customer tag to determine the customer credit level and the customer debiting requirement; a system for deducting the total cost from the customer credit level; and a system for determining and storing a new customer credit level in the customer tag.

Advantages of this invention are set out in detail in the description.

In particular, it is possible to manufacture all receptacles to be the same, this means that the manufacturing process costs can be minimised.

There will need to be less human resource overhead and resources in an establishment using this type of model, which will again give further cost saving and efficiency benefits.

Other advantages and aspects of the invention can be seen in the accompanying claims and description.

BRIEF DESCRIPTION OF THE DRAWINGS

Reference will now be made by way of example, to the accompanying drawings.

FIG. 3 is a table which shows an example of information, which may be stored on the database of FIG. 1.

FIG. 4 is a table which shows information relating to an RFID card associated with specific customers and includes information identifying card credit levels both before and after a charge has been made.

DETAILED DESCRIPTION OF THE INVENTION

Figure 1:
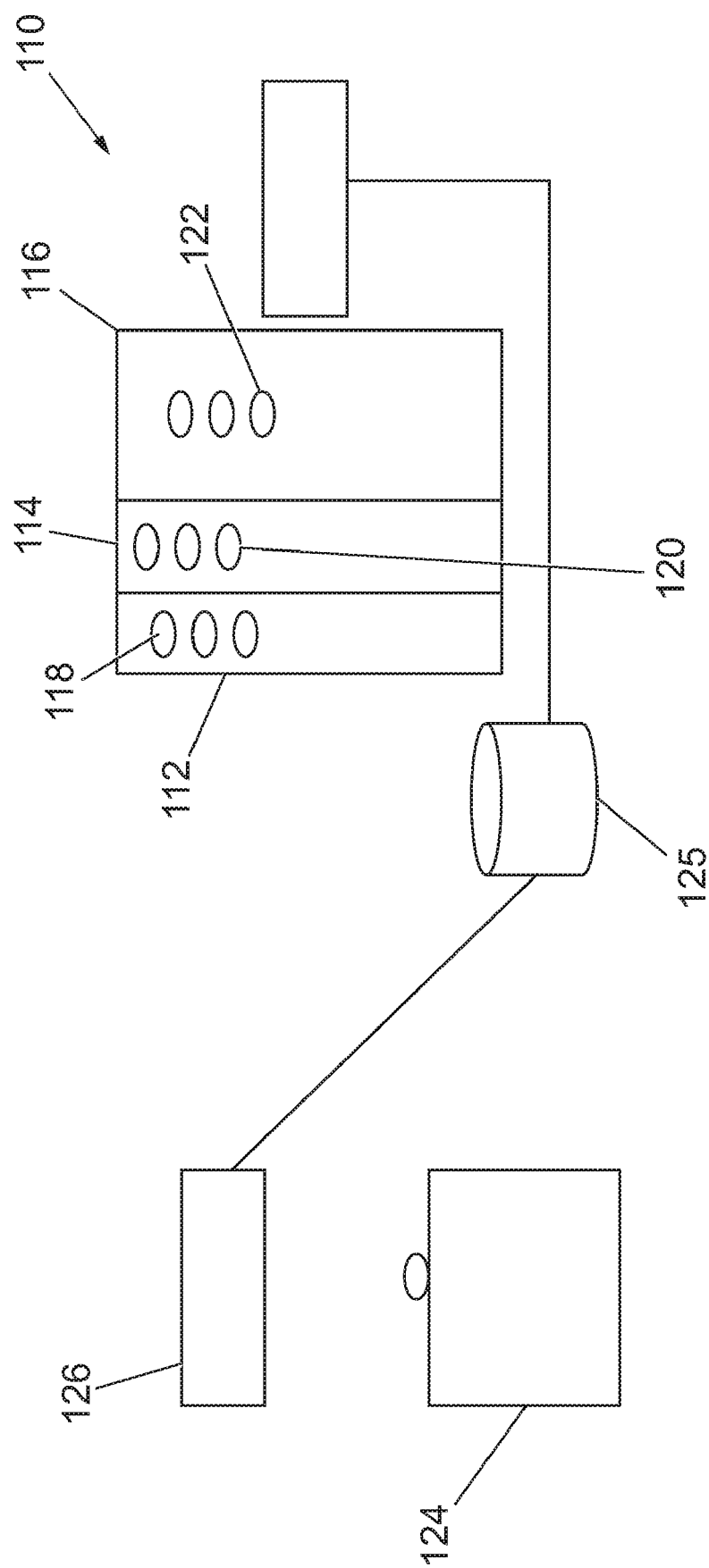
FIG. 1 is a diagram showing how the overall system of self checkout for a retail food establishment may be implemented in accordance with an embodiment of the present invention.

Referring initially to FIG. 1, a self checkout (SCO) system 110, for a retail food and/or drink establishment is shown.

Three separate serving areas 112, 114 and 116 are shown. In each serving area there are a number of receptacles each including a unique tag. The unique tag may take the form of any tag which can be read without contact and in particular may include a radio frequency identification chip (RFID chip).

For ease of this description only, one receptacle in area 112 is given the number 118, one receptacle in area 114 is given the number 120, and one receptable in area 116 the number 122. The numbers will be used later to describe other features of the invention, but in fact each receptacle in a given establishment includes a unique RFID chip and is similarly unique.

The content of the receptacle is dictated by and associated with the serving area from which the receptacle is selected or chosen. The content may be a meal, snack, drink or other item to be selected by a customer. Each receptacle may be the same or different from other receptacles in the same area, but as previously indicated each one has a unique tag embedded within the material thereof.

For the purposes of this invention the term embedded is intended to include any article which forms an integral or substantially integral part of the material of the receptacle. It may include a tag or RFID chip which is partly embedded or attached to the surface and then sealed thereto by an appropriate member or material, or something that is fully embedded in the material of the receptacle.

Prior to service in the establishment the food and/or drink and the receptacles are laid out. For each service area the identity of each receptacle within that area is determined by suitable means, for example, an RFID chip reader. In other words the RFID chip for each receptacle is associated with a service area and thus a content and/or content price.

Later when the customer enters the establishment, the customer may select a tray and then visit various service areas and select a receptacle from one or more thereof.

Figure 2:
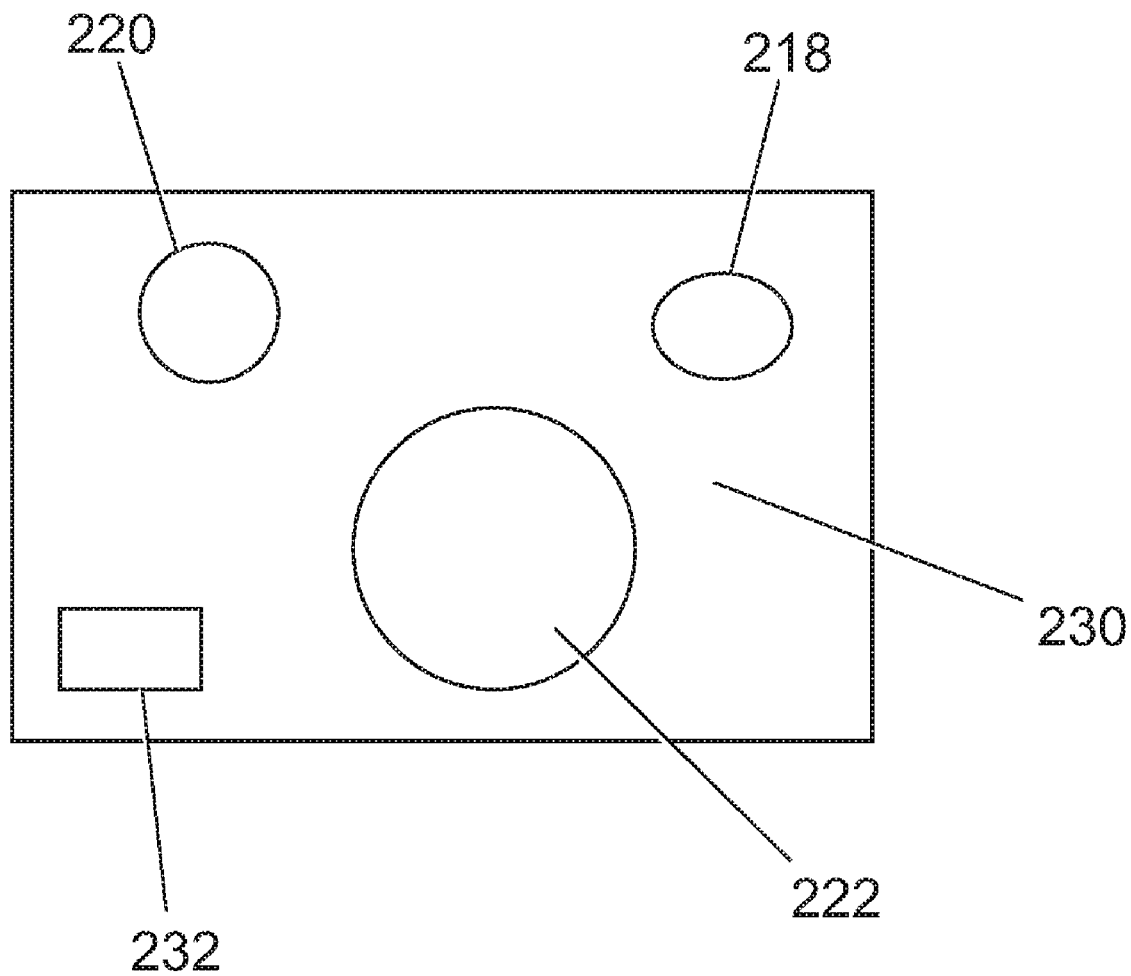
FIG. 2 is a figure illustrating how the self checkout system of FIG. 1 may identify articles and items selected by a customer so as to enable a payment.

Having selected one or more plates of food and/or drink, the customer may then advance to the self checkout station 124. The self checkout station 124 includes a RFID reader 126. The RFID reader 126 scans the tray 230 (See FIG. 2) and identifies that the tray 230 is carrying plates 218, 220 and 222 corresponding to receptacles 118, 120 and 122 (See FIG. 1), respectively. If the establishment also provides provisions of a service whereby a customer ID is used to facilitate payment, the RFID reader 126 may also read a RFID identification element (e.g., an RFID card) 232 which may also be placed on the tray 230 or around the neck or the customer.

Once the RFID reader 126 has read the RFID information associated with everything on the tray 230 (in this case plates 218, 220, 222 and RFID card 232), this information can be used to determine the cost to be charged to the customer either in cash or credit associated with the RFID card 232 as described below.

Referring once again to FIG. 1, a database 125 is also shown. The following description describes how the database 125 functions to enable RFID chip information read by the RFID reader 126 to be used to determine the cost for the customer.

Table 1 (see FIG. 3) shows an example of information, which may be stored on the database 125. The table contains information relating to a serving area (112, 114, 116); receptacle RFID chip number (and thus identify receptacles 118, 120, 122 in this example); cost associated with serving area; tray content indicators and any requirement for debiting the customer. If the RFID reader 126 identifies a specific RFID on the tray 230, a calculation can be made of how much a customer should be debited on his RFID card 232 or should pay if no RFID card 232 exists.

Table 1 may include a different set of information depending on the relevant establishment, as long as there is an association between the receptacle or RFID number and the location from which the receptacle was selected. This can then be used to determine the cost to be charged to a customer. In addition, different establishments may also include the facility to have the weight of a full or semi-full receptacle determined and charge the customer in accordance with the weight and the cost per kilo. An example of when this might occur is in a sushi bar or a salad bar type establishment.

Table 2 (see FIG. 4) shows information relating to an RFID card 232 associated with specific customers and includes information identifying card credit levels both before and after a charge has been made.

As with Table 1, the content of Table 2 may vary in accordance with the specific need of a given establishment. Also, as previously mentioned, some establishments may prefer different methods of customers paying for their goods, for example cash or credit/debit cards. The system of the invention would in such cases be adapted accordingly.

It would be obvious to the person skilled in the art that the database can be configured in many different manners depending on the type of product that is being sold to customers and the payment method. In addition, there may be considerably more receptacles and thus RFID chip numbers, more service areas and as many RFID card numbers as are necessary. Also other parameters may be stored and used to determine the cost to the customer.

The description relates specifically to an eating and/or drinking establishment where customers are taking food or drink from specific catering areas. However, this invention could be used in other situations where customers are selecting receptacle contents from certain areas and the paying for them with a self checkout system which is based on the receptacle and its association with the service area, rather than on the content per se.

In the event that the system does not provide for the existence of an RFID card associated with the customer the RFID reader may generate a bill which the cashier may read in order to obtain a payment from the customer.

In circumstances where an RFID card does exist and a credit on the card or database is less than the debit to be charged the database and the checkout system will prevent the customer being able to complete the self checkout process and return the customer to another station "to recharge the RFID card".

The charges made using an RFID card may be written to the database or directly to the card and may be paid for through the wages process for example.

As previously indicated the RFID chip is embedded within the container rather than associated with the content of the container. This has a number of advantages. As the RFID chip is included in the structure of the container, (for example a plate) the RFID chip can be reused many times. Since the chip is embedded within the material of the container, the container may also be washed. This means that the RFID chip costs are kept to a minimum and any plate can be used for any service area from one day to the next.

Other advantages of the invention include the ability to merge the checkout and payment processes for a customer using RFID related information. In addition, when a container is manufactured with the simple and unique RFID tag, it can be associated with a different price base depending on the catering facility or restaurant for which the container is to be used. This facilitates ease of manufacture and reduces the cost for producing plates with tags embedded therein.

It will be clear that the material of the receptacle can be any appropriate material, for example, china, porcelain, glass, plastic, ceramics, etc.

It should be noted that the present invention has required all the RFID chips to be read only, but it would be possible to provide a system with read/write chips which could be programmed with different information. For example plate number 120 is associated today with area 114 and the chip in this plate may have the price of the food from that area written thereto, to enable charging at the self checkout.

As previously noted this invention make use of RFID chip technology but future evolutions of any other contact-free tag and reading system are also intended to be covered by this invention.

For the purposes of this invention a catering establishment is any establishment which supplies food and drink to customers.

The invention claimed is:

1. A system for providing self checkout for an establishment, the establishment comprising a plurality of separate serving areas, comprising:
   a tray;
   a plurality of receptacles placed on the tray, the plurality of receptacles selected from a plurality of separate serving areas, each serving area comprising a different catering area within the establishment and providing a different type of content, wherein the content of each selected receptacle is dictated and associated with the serving area from which the receptacle was taken;
   a system for reading information in a tag embedded in each selected receptacle placed on the tray, wherein the information in the tag is associated with the serving area from which the receptacle was taken and at least one of the content of the selected receptacle and a cost per unit weight of the content of the selected receptacle;

a system for associating, in a database, the tag information for each selected receptacle with the serving area from which the selected receptacle was taken;

a system for determining a charge for the content of each selected receptacle from the database association;

a tag, located on a customer, containing information regarding a credit level of the customer and a requirement for debiting the customer;

a system for charging a customer for the content of each selected receptacle placed on the tray and determining a total cost to be charged to the customer for the plurality of selected receptacles;

a system for reading the customer tag to determine the customer credit level and the customer debiting requirement;

a system for deducting the total cost from the customer credit level; and a system for determining and storing a new customer credit level in the customer tag.

2. The system of claim 1, further comprising:

a system for reading the tag embedded in each receptacle, as the receptacle is placed in its respective serving area prior to being selected, to associate each receptacle with its respective serving area.

3. The system of claim 1, wherein each receptacle tag comprises a radio frequency identification (RFID) chip.

4. The system of claim 1, wherein each receptacle tag is at least partially embedded in the receptacle.

5. The system of claim 1, wherein the customer tag comprises a radio frequency identification (RFID) card.

6. A system for providing self checkout for an establishment, comprising:

a plurality of receptacles selected from a plurality of separate serving areas, each serving area providing a different type of content, wherein the content of each selected receptacle is dictated and associated with the serving area from which the receptacle was selected;

a system for reading information in a tag embedded in each selected receptacle, wherein the information in the tag is associated with the serving area from which the receptacle was selected and at least one of the content of the selected receptacle and a cost per unit weight of the content of the selected receptacle;

a system for associating, in a database, the tag information for each selected receptacle with the serving area from which the selected receptacle was selected;

a system for determining a charge for the content of each selected receptacle from the database association;

a customer tag containing information regarding a credit level of a customer and a requirement for debiting the customer;

a system for charging the customer for the content of each selected receptacle and for determining a total cost to be charged to the customer for the plurality of selected receptacles;

a system for reading the customer tag to determine the customer credit level and the customer debiting requirement;

a system for deducting the total cost from the customer credit level; and a system for determining and storing a new customer credit level in the customer tag.

7. The system of claim 6, further comprising:

a system for reading the tag embedded in each receptacle, as the receptacle is placed in its respective serving area prior to being selected, to associate each receptacle with its respective serving area.

8. The system of claim 6, wherein each receptacle tag comprises a radio frequency identification (RFID) chip.

9. The system of claim 6, wherein each receptacle tag is at least partially embedded in the receptacle.

10. The system of claim 6, wherein the customer tag comprises a radio frequency identification (RFID) card.

11. A method for providing self checkout for an establishment, comprising:

selecting a plurality of receptacles from a plurality of separate serving areas, each serving area providing a different type of content, wherein the content of each selected receptacle is dictated and associated with the serving area from which the receptacle was selected;

reading information in a tag embedded in each selected receptacle, wherein the information in the tag is associated with the serving area from which the receptacle was selected and at least one of the content of the selected receptacle and a cost per unit weight of the content of the selected receptacle;

associating, in a database, the tag information for each selected receptacle with the serving area from which the selected receptacle was selected;

determining a charge for the content of each selected receptacle from the database association;

charging a customer for the content of each selected receptacle and determining a total cost to be charged to the customer for the plurality of selected receptacles;

reading a customer tag to determine a customer credit level and a customer debiting requirement, the customer tag containing information regarding a credit level of the customer and a requirement for debiting the customer;

deducting the total cost from the customer credit level; and determining and storing a new customer credit level in the customer tag.

12. The method of claim 11, further comprising:

reading the tag embedded in each receptacle, as the receptacle is placed in its respective serving area prior to being selected, to associate each receptacle with its respective serving area.

13. The method of claim 11, wherein each receptacle tag comprises a radio frequency identification (RFID) chip.

14. The method of claim 11, wherein each receptacle tag is at least partially embedded in the receptacle.

15. The method of claim 11, wherein the customer tag comprises a radio frequency identification (RFID) card.

\* \* \* \* \*